(12) United States Patent
Smith

(10) Patent No.: US 6,702,457 B1
(45) Date of Patent: Mar. 9, 2004

(54) METHOD AND APPARATUS FOR A THERMAL WAKE-UP CIRCUIT

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/027,510

(22) Filed: Dec. 20, 2001

(51) Int. Cl.[7] ............................................. G01K 13/00
(52) U.S. Cl. ....................... 374/141; 374/152; 361/103
(58) Field of Search ............................... 374/102, 159, 374/178, 57, 141, 152; 361/103

(56) References Cited

U.S. PATENT DOCUMENTS

| | | | | |
|---|---|---|---|---|
| 3,946,364 A | * | 3/1976 | Codomo et al. | 701/3 |
| 4,627,840 A | * | 12/1986 | Cuadra et al. | 604/151 |
| 4,789,819 A | * | 12/1988 | Nelson | 323/314 |
| 5,225,811 A | * | 7/1993 | Audy | 340/584 |
| 5,255,149 A | * | 10/1993 | Matsuo | 361/103 |
| 5,943,206 A | * | 8/1999 | Crayford | 361/103 |
| 6,250,430 B1 | * | 6/2001 | Kyrtsos | 188/1.11 L |
| 6,286,992 B1 | * | 9/2001 | Kyrtsos | 374/45 |
| 6,421,626 B1 | * | 7/2002 | Yin | 702/132 |

FOREIGN PATENT DOCUMENTS

WO     WO 9103889 A1 *  3/1991 .......... H03K/17/16

* cited by examiner

Primary Examiner—Diego Gutierrez
Assistant Examiner—Lydia M. DeJesús
(74) Attorney, Agent, or Firm—Joshua W. Korver; Merchant & Gould

(57) ABSTRACT

An apparatus and method is directed to a thermal wake-up circuit and a thermal sensor that are utilized by another circuit. The thermal wake-up circuit monitors a temperature associated with the other circuit. The thermal sensor is activated by the thermal wake-up circuit when the temperature exceeds a first threshold level. The thermal sensor is deactivated by the thermal wake-up circuit when the temperature is below the first threshold level. In one embodiment, addition thermal sensors may be activated and deactivated by the thermal wake-up circuit. The thermal sensor and additional thermal sensors may be used to activate protection circuitry or to shut down the other circuit. Power consumption by the thermal sensor is minimized by maintaining the thermal sensor inactive until activated by the thermal wake-up circuit.

20 Claims, 3 Drawing Sheets

US 6,702,457 B1

METHOD AND APPARATUS FOR A THERMAL WAKE-UP CIRCUIT

FIELD OF THE INVENTION

The present invention relates generally to thermal sensors. More particularly, the present invention relates to a thermal wake-up circuit.

BACKGROUND OF THE INVENTION

Circuits and electronic devices are being used for an increasing variety of applications. Some applications may subject the circuits to adverse environmental conditions. One environmental condition often found to affect the operation of a circuit is the temperature.

The circuit can be affected by internal heating of the components or by ambient temperature. Events that occur on the circuit may push excess current through the circuit or device. The ambient temperature can be a result of a number of different sources of heat. The heating of nearby components or connected devices may cause an increase in the temperature associated with a circuit. In addition, changes in ambient temperature resulting from where the circuit is placed or stored may result in adverse circuit operation.

Most electronic circuit are subject to temperature specifications. The temperature specification usually defines a range of temperature recommended for optimal circuit performance. Exceeding the upper limit or lower limit of the temperature range may cause a degradation in circuit operation.

Thermal sensors are often utilized to monitor the temperature associated with a particular circuit. Protection circuitry may be utilized to prevent damage to the circuit as a result of temperature variations.

SUMMARY OF THE INVENTION

The present invention relates generally to thermal sensors. More particularly, the present invention relates to a thermal wake-up circuit and a thermal sensor that are utilized by another circuit. The thermal wake-up circuit provides improved power efficiency by activating temperature sensors as the temperature of the other circuit approaches a level associated with each temperature sensor. The thermal wake-up circuit activates a thermal sensor when the temperature of the other circuit exceeds a first threshold level. Once activated, the thermal sensor monitors when the temperature of the other circuit exceeds a second threshold level. The thermal sensor activates protection circuitry or deactivates the other circuit, preventing adverse circuit operation caused by the temperature increase, when the temperature of the other circuit exceeds the second threshold level. In another embodiment, additional thermal sensors may be used. Each of the additional thermal sensors are activated when the temperature exceeds the first threshold level. Each of the additional thermal sensors monitors the temperature of the other circuit. Each of the additional thermal sensors has an associated threshold level, and may be used to activate other circuitry or deactivate the other circuit according to each associated threshold level.

Stated briefly, an apparatus and method is directed to a thermal wake-up circuit and a thermal sensor that are utilized by another circuit. The thermal wake-up circuit monitors a temperature associated with the other circuit. The thermal sensor is activated by the thermal wake-up circuit when the temperature exceeds a first threshold level. The thermal sensor is deactivated by the thermal wake-up circuit when the temperature is below the first threshold level. In one embodiment, addition thermal sensors may be activated and deactivated by the thermal wake-up circuit. The thermal sensor and additional thermal sensors may be used to activate protection circuitry or to shut down the other circuit. Power consumption by the thermal sensor is minimized by maintaining the thermal sensor inactive until activated by the thermal wake-up circuit.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on".

The present invention generally relates to a thermal wake-up circuit that provides for greater power efficiency in monitoring a temperature associated with an exemplary circuit. The thermal wake-up circuit operates to activate a thermal sensor after the temperature of a particular circuit or device reaches a threshold temperature. A quiescent current received by the thermal sensor is minimized by holding the thermal sensor inactive until the threshold temperature is reached, minimizing power consumption by the exemplary circuit.

Figure 1:
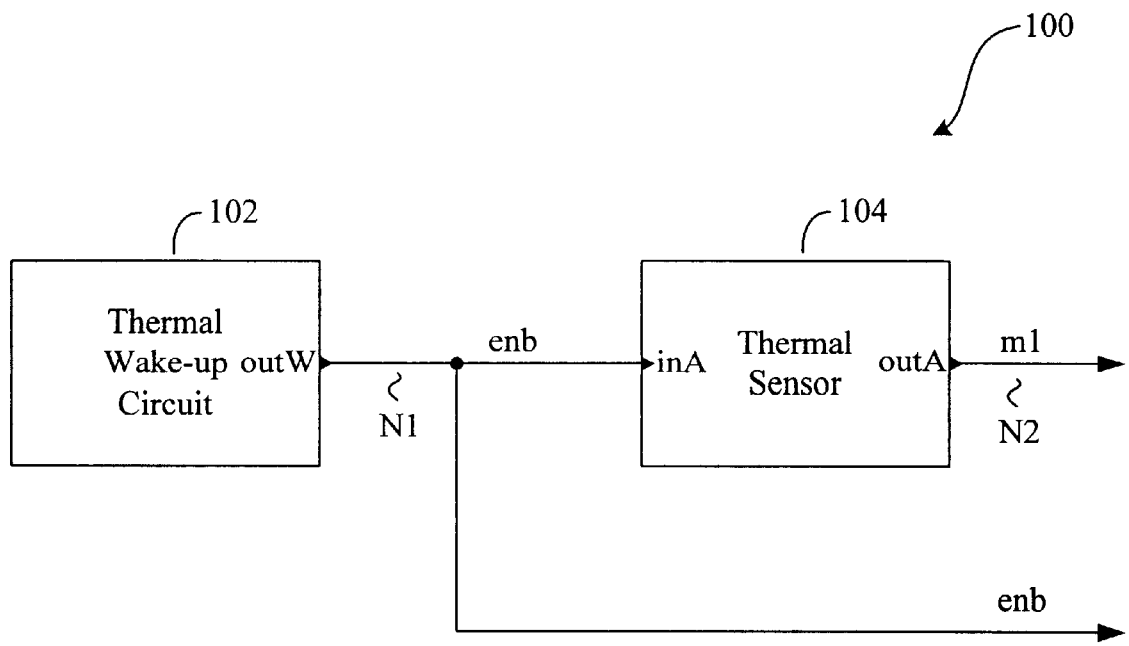
FIG. 1 is a schematic diagram illustrating an exemplary circuit utilizing a thermal wake-up circuit.

FIG. 1 is a schematic diagram illustrating an exemplary circuit utilizing a thermal wake-up circuit. The exemplary circuit (100) includes a thermal wake-up circuit (102) and a thermal sensor (104).

The thermal wake-up circuit includes an output (outW) that is coupled to a first node (N1). The thermal sensor includes an input (inA) that is coupled to the first node (N1) and an output (outA) that is coupled to a second node (N2).

In operation, the thermal wake-up circuit (102) produces an enable signal (enb) in response to the temperature of the exemplary circuit (100) reaching a first threshold level. The thermal sensor (104) is activated in response to the enable signal (enb). In one embodiment, the thermal sensor (104) is configured to monitor the temperature of the exemplary circuit (100). The thermal sensor (104) produces a control signal (m1) when the temperature approaches or passes a second threshold. The exemplary circuit (100) utilizes the control signal (m1) to alter the operation of the exemplary circuit (100). In one embodiment, the control signal (m1) activates a protection circuit (not shown) that is arranged to prevent thermally induced damage to the exemplary circuit (100). In one example, the exemplary circuit (100) include a battery charging circuit (not shown) that is susceptible to damage under high temperatures. The battery charging circuit may be deactivated in response to the control signal (m1), or the charging current may be reduced to limit the temperature of the battery charging circuit. The exemplary circuit (100) is returned to normal operation in response to the enable signal (enb) once the temperature returns to an acceptable level (e.g., below 70° C.). The battery charging circuit is reactivated (if shut down) and the protection circuit (not shown) is deactivated in response to the enable signal (enb).

The thermal wake-up circuit (102) is arranged to limit the power consumption by the thermal sensor (104). The thermal sensor (104) has a quiescent current that is dependent on the size and type of the thermal sensor (104) and whether the thermal sensor (104) is activated. In the present invention, the thermal sensor (104) is activated in response to the enable signal (enb), which is produced by the thermal wake-up circuit (102). The thermal sensor (104) is inactive until the enable signal (enb) is asserted. The enable signal (enb) is asserted when the temperature reaches the first threshold level associated with the thermal wake-up circuit (102). The power consumption of the thermal sensor (104) is reduced when the thermal sensor (104) is inactive. The additional power available may be used elsewhere in the exemplary circuit (100) or may be used to reduce the rated power consumption of the exemplary circuit (100). In addition, a smaller or more accurate thermal sensor may be used by minimizing the power consumption of the thermal sensor (104). Smaller thermal sensors require a larger quiescent current to maintain the accuracy of larger thermal sensors, increasing the power consumption. Also, the larger the quiescent current for thermal sensors of equal size, the more improved the accuracy. Decreasing the power consumption of the thermal sensor (104) allows a smaller or more accurate thermal sensor to be used.

In one embodiment, the threshold levels are set according to a temperature that is determined by the thermal specifications of the exemplary circuit (100) or a subsequent circuit (not shown). The first threshold level is set such that the temperature reaches the first threshold level prior to reaching a temperature that may cause adverse circuit operation.

In another embodiment, the thermal sensor (104) includes a thermal comparator that is configured to compare the temperature of the exemplary circuit (100) to a threshold level. For one type of thermal comparator, the control signal (m1) of the thermal sensor (104) is a digital signal. For example, the control signal (m1) is a low logic level (logic "0") before the temperature of the exemplary circuit (100) passes the threshold level, and is a high logic output (logic "1") after the threshold level is reached.

In yet another embodiment, a subsequent circuit (not shown) is activated or deactivated in response to the control signal (m1). For example, a protection circuit may be activated in response to the control signal (m1) to protect the exemplary circuit and any other subsequent circuitry from a high temperature. In another example, the operation of the exemplary circuit (100) is causing a increase in temperature, such as when the exemplary circuit (100) is operating with a high current condition. The source of power to either the exemplary circuit (100) may be decreased. The decrease in power supplied to the exemplary circuit (100) reduces the current which reduces the temperature.

In one example, a protection circuit (not shown) is included to shut-down the operation of the exemplary circuit (100) or a subsequent circuit (not shown). The protection circuit operates as a thermal shutdown circuit by deactivating subsequent exemplary circuit (100) or subsequent circuit (not shown) when the temperature reaches a threshold level. Alternatively, power supplied to the exemplary circuit (100) or subsequent circuit (not shown) may be reduced to prevent the temperature from increasing further without shutting down the exemplary circuit or subsequent circuit.

In another embodiment, the temperature of the exemplary circuit (100) is measured according to a temperature associated with other circuitry (not shown) included in the exemplary circuit (100) such as the battery charging circuit mentioned above. In another example, the exemplary circuit (100) may be include communication circuitry, and be powered by a battery cell. The temperature of the exemplary circuit (100) that is monitored by the thermal wake-up circuit (102) and the thermal sensor (104) may correspond to a temperature of the battery cell or a temperature of the communication circuitry.

In another embodiment, the thermal wake-up circuit (102) and the thermal sensor (104) are responsive to the temperature of another or subsequent circuit (not shown) rather than the temperature associated with the exemplary circuit (100). The other circuit or subsequent circuit (not shown) can include circuits such as battery-powered circuits, battery-charging circuits, power-limited circuits, as well as others that are not included in the exemplary circuit (100).

Figure 2:
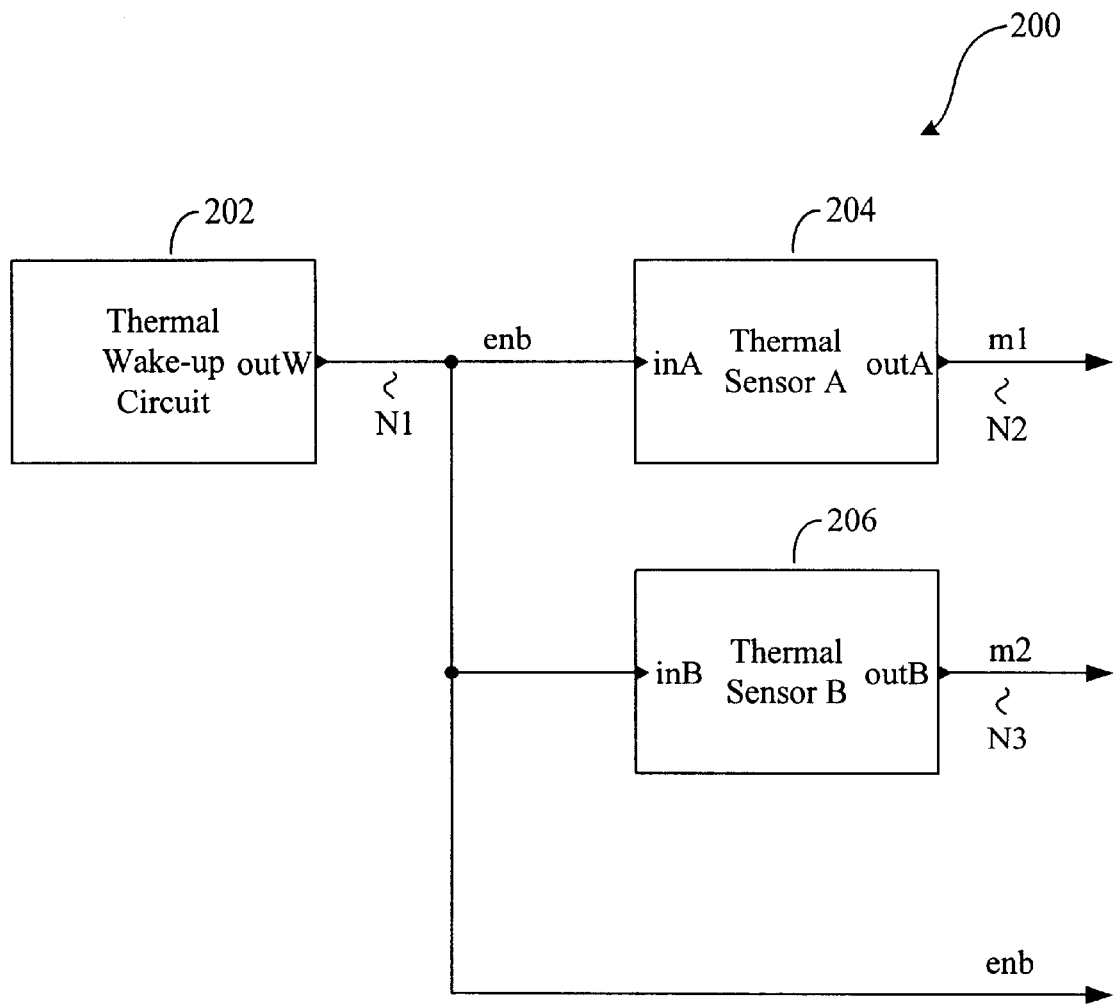
FIG. 2 is a schematic diagram showing another exemplary circuit utilizing a thermal wake-up circuit.

FIG. 2 is a schematic diagram illustrating an exemplary circuit utilizing a thermal wake-up circuit. The exemplary circuit (200) includes a thermal wake-up circuit (202) and two thermal sensors (204, 206).

The thermal wake-up circuit includes an output (outW) that is coupled to a first node (N1). The first thermal sensor includes an input (inA) that is coupled to the first node (N1) and an output (outA) that is coupled to a second node (N2). The second thermal sensor includes an input (inB) that is coupled to the first node (N1) and an output (outB) that is coupled to a third node (N3).

In operation, the exemplary circuit (200) operates similarly to the exemplary circuit (100) shown in FIG. 1. The thermal wake-up circuit (202) produces an enable signal (enb) in response to the temperature of the exemplary circuit (200) exceeds a first threshold level. For example, the thermal wake-up circuit (202) may produce the enable signal (enb) when the temperature exceeds 70° C. The first and second thermal sensors (204, 206) are activated in response to the enable signal (enb). The first and second thermal sensors (204, 206) are configured to monitor the temperature of the exemplary circuit (200) or a subsequent circuit (not shown). The first thermal sensor (204) produces a first control signal (m1) in response to the temperature exceeding a second threshold level (e.g., 90° C.). The second thermal sensor (204) produces a second control signal (m2) in response to the temperature exceeding a third threshold level (e.g., 110° C.). The exemplary circuit (200) utilizes at least one of the first control signal (m1) and the second control signal (m2) to alter the operation of the exemplary circuit (200).

In one embodiment, the first and second thermal sensors (204, 206) are configured to operate differently. For example, the first thermal sensor (204) operates as a thermal monitor. The first thermal sensor (204) monitors the temperature of the exemplary circuit (200), and produces the first control signal (m1). The first control signal (m1) increases in potential as the temperature approaches the second threshold level. The exemplary circuit (200) or a subsequent circuit can be gradually activated or deactivated in response to the first control signal (m1). The second thermal sensor (206) operates as a thermal comparator. The second thermal sensor (206) produces the first control signal (m1) in response to a comparison of the third threshold level to the temperature of the exemplary circuit (200). The second thermal sensor (206) is configured as a thermal shut-down circuit wherein the exemplary circuit (200) is deactivated in response to the second control signal (m2).

In one example, a battery charging circuit (not shown) includes a passive transistor that passes current from a power source to a battery cell the battery charging circuit is included in the exemplary circuit (200) or a subsequent circuit (not shown). The current passed through the passive transistor can heat the passive transistor increasing the temperature. The first thermal sensor (204) operates to gradually reduce the power delivered to the battery charging circuit when the temperature exceeds the second threshold level (e.g., 90° C.). Shutting down the battery charging circuit gradually, allows the battery charging circuit to continue operating while reducing the temperature. Additionally, for certain configurations, the resistance of the passive transistor increases as the passive transistor deactivates. The temperature also increases as the resistance of the passive transistor increases, leading to a resistance-thermal runaway. The first control signal (m1), mentioned previously, provides a monitor of the temperature of the battery charge circuit (not shown) such that the passive transistor may be shut-down gradually to prevent the resistance-thermnal runaway. By monitoring the temperature of the battery charge circuit (not shown), the passive transistor may be deactivated to a level that reduces the temperature of the battery charge circuit while preventing resistance-thermal runaway. In the event that the temperature continues to increase, the second thermal sensor (206) operates as a thermal shut-down circuit and deactivates the passive transistor when the temperature exceeds the third threshold level (e.g. 110° C.). The exemplary circuit (100) is returned to normal operation in response to the enable signal (enb) once the temperature returns to an acceptable level (e.g., below 70° C.). The battery charging circuit is reactivated (if shut down) and the power supplied to the battery charging circuit is returned to its normal level in response to the enable signal (enb).

The thermal wake-up circuit (202) minimizes the power consumption by the first and second thermal sensors (204, 206). The thermal wake-up circuit (202) activates the first and second thermal sensors (204, 206) when the temperature of the exemplary circuit (200) or a subsequent circuit (not shown) approaches a first threshold level. The first and second thermal sensors (204, 206) remain inactive until activated in response to the enable signal (enb) produced by the thermal wake-up circuit (202). In one embodiment, the temperature approaches the first threshold level before approaching the second and third threshold levels.

In one embodiment, the temperature of the exemplary circuit (200) is measured according to a temperature associated with other circuitry (not shown) included in the exemplary circuit (200) such as the battery charging circuit mentioned above. In another example, the exemplary circuit (200) may be include communication circuitry, and be powered by a battery cell. The temperature of the exemplary circuit (200) that is monitored by the thermal wake-up circuit (202) and the thermal sensors (204, 206) may correspond to a temperature of the battery cell or a temperature of the communication circuitry.

In another embodiment, the thermal wake-up circuit (202) and the thermal sensors (204, 206) are responsive to the temperature of another or subsequent circuit (not shown) rather than the temperature associated with the exemplary circuit (200). The other circuit or subsequent circuit (not shown) can include circuits such as battery-powered circuits, battery-charging circuits, power-limited circuits, as well as others that are not included in the exemplary circuit (200).

Figure 3:
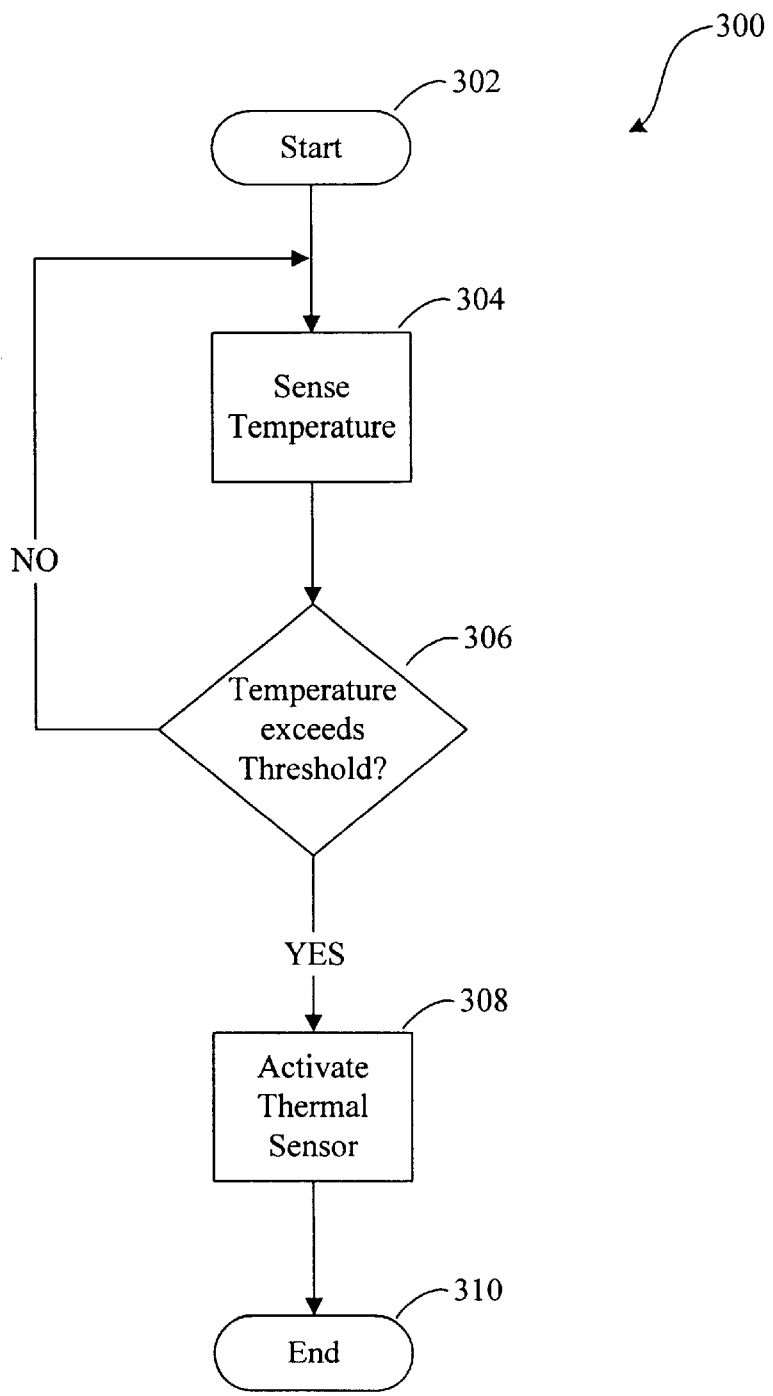
FIG. 3 is a operational flow diagram which generally illustrates a process for utilizing a thermal wake-up circuit, in accordance with the present invention.

FIG. 3 is an operational flow diagram which generally illustrates a process for utilizing a thermal wake-up circuit. The process (300) begins at a start block 302. The process (300) advances to a block 304, where the temperature of a predetermined circuit is sensed or measured. In one embodiment, the temperature is sensed by a thermal wake-up circuit similar to the thermal wake-up circuit (202) illustrated in FIG. 2. Once the temperature of the predetermined circuit or device is sensed, the process (300) proceeds to a decision block 306.

At decision block 306, the temperature is compared to a threshold level. In one embodiment, the temperature is compared to the threshold level by a thermal wake-up circuit similar to the thermal wake-up circuit (202) illustrated in FIG. 2. If the temperature has not exceeded the threshold level, the process (300) returns to block 304. If the temperature exceeds the threshold level, the process (300) advances to block 308.

At block 308, a thermal sensor is activated. In one embodiment, the thermal sensor is activated by an enable signal produced by a thermal wake-up circuit similar to the thermal wake-up circuit (202) illustrated in FIG. 2. The enable signal is produced by the thermal wake-up circuit in response to the comparison of the temperature to the threshold level. In another embodiment, additional thermal sensors may be activated in response to the enable signal. After the thermal sensor is activated, the process (300) advances to end block 310 where the process ends.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for sensing a temperature associated with a circuit being monitored, the apparatus comprising:
   a thermal sensor that is configured to sense the temperature associated with the circuit being monitored when the thermal sensor is activated by an enable signal; and
   a thermal wake-up circuit that is configured to produce the enable signal, such that the thermal sensor is active when the temperature associated with the circuit being monitored is above a first threshold level, and the thermal sensor is inactive when the temperature associated with the circuit being monitored is below the first threshold level, wherein power consumption of the apparatus is minimized by deactivating the thermal sensor.

2. An apparatus as in claim 1, wherein the thermal sensor includes a thermal comparator that is arranged to compare the temperature to a second threshold level.

3. An apparatus as in claim 1, wherein the thermal sensor operates as a thermal shut-down circuit such that the circuit being monitored is shut down in response to a control signal produced by the thermal sensor when the temperature associated with the circuit being monitored exceeds a second threshold level.

4. An apparatus as in claim 1, wherein the thermal sensor has an associated quiescent current when active, such that power consumption of the apparatus is minimized by maintaining the thermal sensor inactive until the temperature associated with the circuit being monitored exceeds the fist threshold level.

5. An apparatus as in claim 1, where the temperature associated with the circuit being monitored corresponds to a temperature of a pass transistor included in a battery charging circuit.

6. An apparatus as in claim 5, wherein the pass transistor is gradually deactivated in response to a control signal produced by the thermal sensor, such that the temperature associated with the circuit being monitored decreases.

7. An apparatus as in claim 1, further comprising an additional thermal sensor that is configured to sense the temperature associated with the circuit being monitored when the additional thermal sensor is activated by the enable signal.

8. An apparatus as in claim 1, wherein the circuit being monitored is gradually deactivated in response to a control signal produced by the thermal sensor when the temperature associated with the circuit being monitored exceeds the second threshold level.

9. An apparatus as in claim 1, wherein the temperature associated with the circuit being monitored reaches the first threshold level prior to reaching a temperature that causes adverse circuit operation.

10. An apparatus as in claim 1, wherein power supplied to the circuit being monitored is decreased in response to a control signal produced by the thermal sensor when the temperature associated with the circuit being monitored exceeds a second threshold level.

11. An apparatus as in claim 1, wherein the thermal sensor produces a control signal, wherein operation of the circuit being monitored is altered in response to the control signal.

12. A method for activating a thermal sensor that is associated with a circuit being monitored comprising:

sensing a temperature associated with the circuit being monitored;

comparing the temperature associated with the circuit being monitored to a first threshold level;

activating the thermal sensor when the temperature associated with the circuit being monitored exceeds the first threshold level, and deactivating the thermal sensor when the temperature associated with the circuit being monitored is below the first threshold level, such that power consumption by the thermal sensor is minimized.

13. The method of claim 12, further comprising:

comparing the temperature to a second threshold level; and decreasing power delivered to the circuit being monitored when the temperature associated with the circuit being monitored is above the second threshold level.

14. The method of claim 12, further comprising reactivating the circuit being monitored in response to an enable signal produced by a thermal wake-up circuit when the temperature associated with the circuit being monitored decreases below the first threshold level.

15. The method of claim 14, further comprising deactivating the circuit being monitored in response to a control signal produced by the thermal sensor when the temperature associated with the circuit being monitored exceeds a second threshold level.

16. The method of claim 12, wherein activating the thermal sensor further comprises activating the thermal sensor in response to an enable signal that is produced in response to the comparison of the temperature associated with the circuit being monitored to the first threshold level.

17. The method of claim 12, further comprising setting the first threshold level to a level at which the thermal sensor is activated prior to the temperature adversely affecting operation of the circuit being monitored.

18. The method of claim 12, further comprising activating an additional thermal sensor in response to the comparison of the temperature to the first threshold level, such that power consumption by the additional thermal sensor is minimized.

19. An apparatus for activating a thermal sensor associated with a circuit being monitored, comprising:

a means that is arranged to sense a temperature associated with the circuit being monitored;

the means being further arranged to compare the temperature associated with the circuit being monitored to a first threshold level;

a the means being further arranged to activate the thermal sensor when the temperature associated with the circuit being monitored exceeds the first threshold level, and the means being further arranged to deactivate when the temperature associated with the circuit being monitored is below the first threshold level, such that power consumption by the thermal sensor is minimized.

20. The apparatus of claim 19, wherein the mean is further arranged to activate an additional thermal sensor in response to the comparison of the temperature to the first threshold level, such that power consumption by the additional thermal sensor is minimized.

* * * * *

UNITED STATES PATENT AND TRADEMARK OFFICE
CERTIFICATE OF CORRECTION

PATENT NO. : 6,702,457 B1
DATED : March 9, 2004
INVENTOR(S) : Gregory J. Smith

It is certified that error appears in the above-identified patent and that said Letters Patent is hereby corrected as shown below:

<u>Column 5,</u>
Line 42, please change "thermnal" to -- thermal --.

<u>Column 7,</u>
Line 17, please change "fist" to -- first --.
Line 50, please change "monitored comprising" to -- monitored, comprising --.

<u>Column 8,</u>
Line 45, please change "a the means" to -- the means --.

Signed and Sealed this

First Day of June, 2004

JON W. DUDAS
*Acting Director of the United States Patent and Trademark Office*